(12) United States Patent
Breslow et al.

(10) Patent No.: US 11,157,174 B2
(45) Date of Patent: Oct. 26, 2021

(54) HYBRID FIRST-FIT K-CHOICE INSERTIONS FOR HASH TABLES, HASH SETS, APPROXIMATE SET MEMBERSHIP DATA STRUCTURES, AND CACHES

(71) Applicant: Advanced Micro Devices, Inc., Santa Clara, CA (US)

(72) Inventors: Alexander D. Breslow, Tucson, AZ (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/659,559

(22) Filed: Oct. 21, 2019

(65) Prior Publication Data

US 2021/0117100 A1 Apr. 22, 2021

(51) Int. Cl.
*G06F 12/128* (2016.01)
*G06F 3/06* (2006.01)
*G06F 16/22* (2019.01)

(52) U.S. Cl.
CPC .......... *G06F 3/0608* (2013.01); *G06F 3/0644* (2013.01); *G06F 3/0673* (2013.01); *G06F 12/128* (2013.01); *G06F 16/2255* (2019.01)

(58) Field of Classification Search
CPC ............... G06F 12/0864; G06F 12/128; G06F 16/2255; G06F 16/9014; G06F 16/2462
See application file for complete search history.

(56) References Cited

U.S. PATENT DOCUMENTS

| | | | | |
|---|---|---|---|---|
| 2009/0249023 | A1* | 10/2009 | Qiao | G06F 16/24556 711/216 |
| 2015/0052309 | A1* | 2/2015 | Philip | G06F 12/082 711/128 |
| 2017/0235496 | A1* | 8/2017 | Brosch | G06F 16/1748 707/692 |
| 2017/0286292 | A1* | 10/2017 | Levy | G06F 12/04 |
| 2017/0300592 | A1* | 10/2017 | Breslow | G06F 16/9014 |

OTHER PUBLICATIONS

Erlingsson, U., Manasse, M. and F. McSherry, "A Cool and Practical Alternative to Traditional Hash Tables," Proc. of the Workshop on Distributed Data and Structures (WDAS), 2006.*
Wikipedia, "Histogram," Oct. 16, 2019, http://web.archive.org/web/20191016033445/https://en.wikipedia.org/wiki/Histogram, accessed Dec. 31, 2020.*

(Continued)

*Primary Examiner* — Tracy A Warren
(74) *Attorney, Agent, or Firm* — Volpe Koenig

(57) ABSTRACT

A hybrid mechanism for operating on a data item in connection with an associative structure combines first-fit and K-choice. The hybrid mechanism leverages advantages of both approaches by choosing whether to insert, retrieve, delete, or modify a data item using either first-fit or K-choice. Based on the data item, a function of the data item, and/or other factors such as the load statistics of the associative structure, one of either first-fit or K-choice is used to improve operation on the associative structure across a variety of different load states of the associative structure.

20 Claims, 9 Drawing Sheets

(56) References Cited

OTHER PUBLICATIONS

Breslow, A., et al., "Horton Tables: Fast Hash Tables for In-Memory Data-Intensive Computing", Proceedings of the 2016 USENIX Annual Technical Conference, pp. 281-294, USENIX Association, Denver, CO, Jun. 2016.

Azar, Y., et al., "Balanced Allocations", SIAM Journal of Computing, vol. 29, No. 1, pp. 180-200, Society for Industrial and Applied Mathematics, 1999.

Fan, B., et al., "Cuckoo Filter: Practically Better Than Bloom", Proceedings of the 10th ACM International on Conference on emerging Networking Experiments and Technologies, pp. 75-88, ACM, Dec. 2014.

Mitzenmacher, M., et al., "The Power of Two Random Choices: A Survey of Techniques and Results", 60 pgs., downloaded from: https://www.eecs.harvard.edu/~michaelm/postscripts/handbook2001.pdf.

Fan, B., et al., "MemC3: Compact and Concurrent MemCache with Dumber Caching and Smarter Hashing", Proceedings of the 10th USENIX Symposium on Networked Systems Design and Implementation, 14 pgs., Apr. 2013.

Breslow, A & Jayasena, N.,"Morton Filters: Faster, Space-Efficient Cuckoo Filters via Biasing, Compression, and Decoupled Logical Sparsity", Proceedings of the VLDB Endowment, vol. 11, No. 9, pp. 1041-1055, 2018.

Ousterhout, K., et al., "Sparrow: Distributed, Low Latency Scheduling", SOSP '13, 16 pgs., ACM, Nov. 2013.

Bender, M., et al., "Don't Thrash: How to Cache Your Hash on Flash", Proceedings of the VLDB Endowment vol. 5, No. 11, pp. 1627-1637, 2012.

Bonomi, F., et al., "An Improved Construction for Counting Bloom Filters, European Symposium on Algorithms", ESA 2006, LNCS 1468, pp. 684-695, Springer-Verlag Berlin,Heidelberg, 2006.

Einziger, G. & Friedman, R., "TinySet—An Access Efficient Self Adjusting Bloom Filter Construction", Technicon Computer Science Department Technical Report CS Mar. 2015, 20 pgs., 2015.

Eppstein, D., et al., "2-3 Cuckoo Filters for Faster Triangle Listing and Set Intersection", PODS '17, pp. 247-260, ACM, May 2017.

\* cited by examiner

HYBRID FIRST-FIT K-CHOICE INSERTIONS FOR HASH TABLES, HASH SETS, APPROXIMATE SET MEMBERSHIP DATA STRUCTURES, AND CACHES

BACKGROUND

Associative structures are core primitives used prevalently in computer technology such as key-value stores, high-performance computing (HPC), data analytics, and other domains. An associative structure may also be viewed as a collection of one or more associative structures. In an associative structure, a data item may be stored in a bucket that can hold a plurality of data items. Hereinafter, bucket, bin, or set may be used interchangeably to describe a storage location that can hold a plurality of data items. In an associative structure, the order of items within the bucket does not alter the meaning of the items within the bucket. Thus, any open slot for an item within a bucket is equivalent to another open slot within the bucket. For example, a 4-way set associative data structure may include a plurality of buckets, wherein each bucket can hold up to four data items, wherein the order of the four items within each bucket is ignored. Thus, all of the permutations of four items within a bucket are viewed equivalently.

Examples of associative structures include a hash table, a hash set, a cache, etc. A hash table is an associative data structure that may be implemented in software, hardware, or a combination of software and hardware. In one example, a static random access memory (SRAM) may be used to store and manage a networking routing table. Typically, to populate a hash table with data items, one or more functions, often referred to as hash functions, are applied to the data item to calculate one or more candidate buckets within which to store the data item or, in some cases, a shortened version of the data item. If at least one of the one or more candidate buckets has free space to store the data item, the data item is inserted into one of the buckets with available space. One or more hash functions may also be used to retrieve, alter, or delete a data item in the hash table.

A load on an associative structure can be described as a percentage of overall space utilized to store data items. A challenge associated with an associative structure includes maximizing utilization of available space in the structure while preserving fast, efficient insertion and retrieval performance. As such, a goal of an associative structure is to place items in the structure in such a way that the average number of candidate buckets that need to be examined per insertion is minimized for a given level of load (e.g. 75% full) and subsequent retrieval or modification of the stored item is efficient, at least in aggregate.

In an example scenario wherein a networking routing table is stored in memory, a subset of information from the routing table may be stored in SRAMs. Due to the cost of SRAMs, not all information of interest may be stored there. If required data is not in the SRAM, but instead in dynamic random access memory (DRAM), throughput could be reduced. A need exists to better manage the networking routing table such that less data is moved to/from DRAM. A networking routing table that maintains high throughput despite being heavily loaded is thus desirable.

In general, maintaining high throughput despite a heavily loaded associative structure is beneficial to various implementations. Such implementations include, for example, software implementations of hash tables and other associative data structures, maintenance of a hot working set, a cache and associated cache lines, and a translation lookaside buffer (TLB). Improvement in insertion throughput and efficiency improves, for example, hardware cache bandwidth, hardware cache capacity, memory bandwidth, memory capacity, TLB capacity, TLB bandwidth, and memory management unit (MMU) page walk throughput.

BRIEF DESCRIPTION OF THE DRAWINGS

A more detailed understanding can be had from the following description, given by way of example in conjunction with the accompanying drawings wherein.

DETAILED DESCRIPTION

Figure 1:
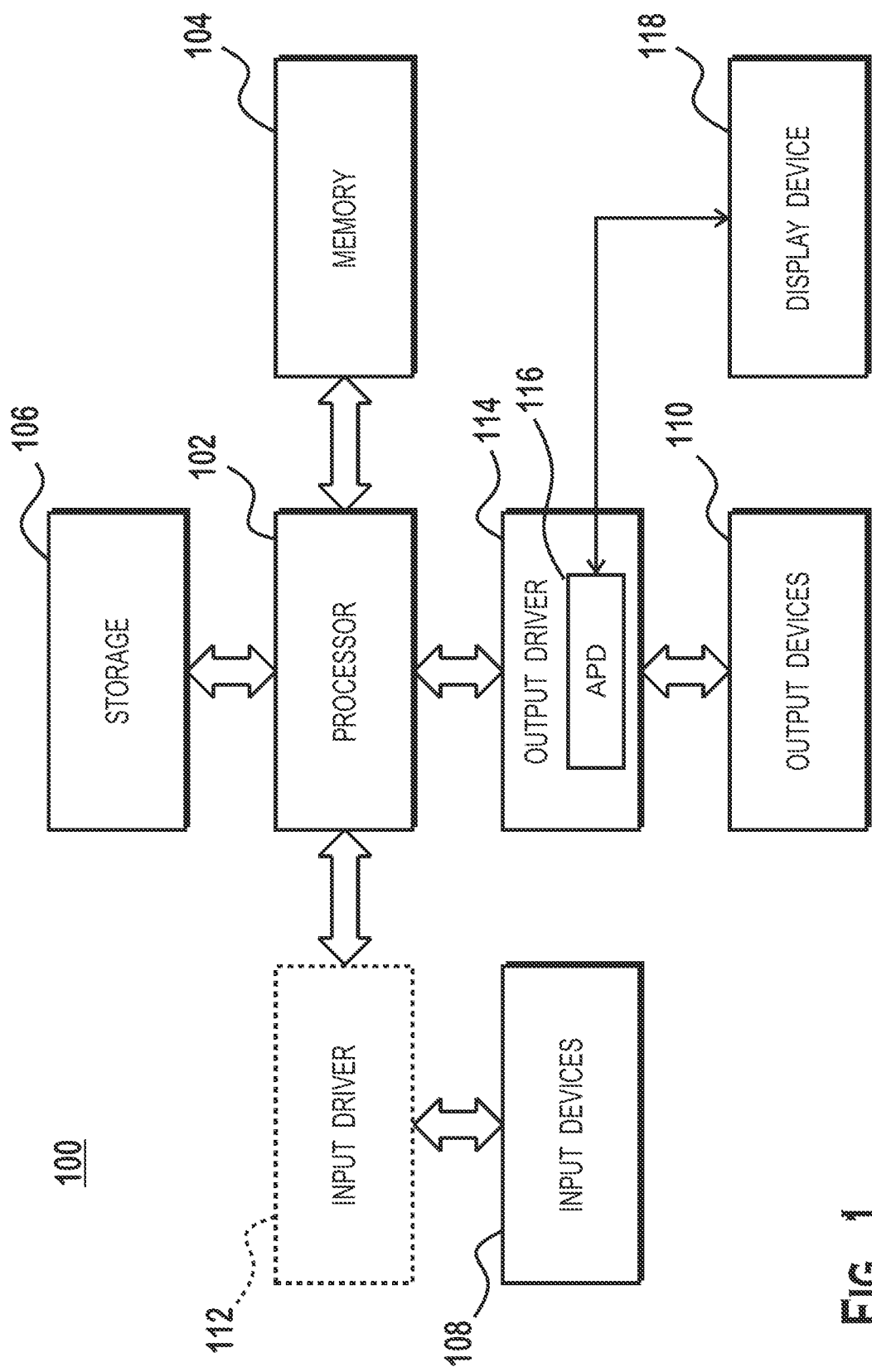
FIG. 1 is a block diagram of an example device in which one or more features of the disclosure can be implemented.

A set of mechanisms is described herein for improving insertion and lookup performance for associative structures such as hash tables, hash sets, caches, etc.

Two ways of inserting data items into, for example, a hash table where each data item can map to more than one bucket include "first-fit" and "K-choice". When inserting data items using a first-fit approach, a data item is placed into the first candidate bucket that has free capacity. In this way, one or more hash functions are applied to the data item to transform the data item into one or more storage locations corresponding to one or more respective candidate buckets. A first candidate bucket is examined and if the first candidate bucket has available space, the data item is placed in the first candidate bucket. Otherwise, in series, additional candidate buckets are examined one at a time until a candidate bucket with available space is found or the insertion fails for not having found a candidate bucket with available space.

The K-choice approach examines K (2<=K<=N) candidate buckets of all possible buckets (N), determines the respective loads of the K candidate buckets, and inserts the data item in the candidate bucket with the lowest relative load of the K candidate buckets. If the K candidate buckets are full, additional groups of K candidate buckets may be examined at a time.

A hash table, for example, populated by K-choice likely has many more buckets with close to the mean load than if the hash table were populated by first-fit, even when loading of the hash table is high. The maximum expected load on any bucket using K-choice insertion is O(log(log(N))), whereas the maximum expected load for first-fit is O(log (N)). Note that the prior mathematics assumes elements are always placed in their first bucket. Cuckoo hashing, which will be described in more detail below, does redistribute some of the load, but outcomes are not as balanced as cuckoo hashing with K-choice.

K-choice's weakness is that it sacrifices performance by always examining at least K buckets when performing an insertion. On the other hand, first-fit may only examine one bucket if the examined bucket has free capacity. First-fit, however, may also serially examine up to N candidate buckets until one with free capacity is found. Thus, the first-fit approach may be viewed as serially operating on single candidate buckets per insertion attempt, whereas K-choice may be viewed as operating on K-candidate buckets in parallel per insertion attempt.

K-choice also has ramifications for data item lookups. For an equal probability of least load across the K candidate buckets, then the expected number of buckets that need to be examined on a successful lookup is (K+1)/2. For K=2, this is 1.5 buckets which is 50% more than the ideal cost of one bucket, which is practically achievable by first-fit when the load is low. For an unsuccessful lookup, the cost is K unique accesses, one for each candidate bucket.

The first-fit approach is fast if the candidate buckets are mostly empty or lightly loaded because the first examined candidate bucket is likely to have available space for the data item to be inserted. However, if the average load of the buckets is high, this approach is slow because more candidate buckets will need to be examined in series until a bucket with free space is found or the insertion fails Because candidate buckets are fetched in series, latency penalties are incurred when a data item cannot be placed in the first examined candidate bucket. Furthermore, a hash table, for example, populated by a first-fit insertion approach usually exhibits unfavorably high skew in the loading of different buckets, such that a high relative number of buckets may be full while other buckets are relatively empty for a given average bucket load. In such a scenario, it is more likely that a higher number of candidate buckets will need to be examined to find one with available space and it is more likely that the insertion could fail due to all candidate buckets being full. When all candidate buckets are full, a comparatively expensive mechanism like "cuckoo hashing" may be employed. More details on cuckoo hashing will be provided below.

In the context of caches, conservation of memory bandwidth is important for performance because memory bandwidth is scarce and easily saturates if a portion of loads and stores (e.g., 40%) go to memory rather than to cache. If the memory bus is being saturated, it is desirable to move as small an amount of data as possible per operation (e.g., insertion). Thus, it is advantageous to only access one unique cache line, e.g. via first-fit algorithms, rather than multiple cache lines, e.g. via an algorithm such as K-choice, when limited by memory bandwidth.

In the context of translation look-aside buffers (TLBs), accessing fewer cache lines often improves data TLB hit ratios, particularly for random data access patterns that access many different pages in quick succession. Realizing high TLB hit ratios is important for obtaining good performance. In some systems, TLB bandwidth and capacity limit are the limiting factor for associative structures, not the memory bandwidth. Accesses to hash tables are often pseudorandom, and as such, it is often the case that for bucketized cuckoo hash tables that the two candidate buckets for an insertion of a data item appear in different pages of memory. Thus, the TLB in all likelihood would need to install two different entries in the TLB to service the address translations for the pages containing the two different buckets if both buckets are accessed. In this scenario, using a first-fit algorithm is beneficial as it only requires access to a single bucket when the first bucket has spare capacity. In this event, the second bucket is not accessed, so the TLB entry for the second bucket is not installed. Thus, when most insertions only require accessing a single bucket, employing a first-fit insertion algorithm is beneficial to reduce TLB misses per insertion operation.

First-fit breaks down, however, once an associative structure becomes moderately to heavily loaded. Because first-fit places items in the first bucket whenever possible, it achieves a load distribution across buckets that is fairly skewed. That is, some buckets have significantly more load than others. An ideal hash table would evenly distribute load across buckets such that the minimum number of required buckets reach capacity. For instance, with four-slot buckets, an ideal associative structure has spare bucket capacity in each bucket up to a load factor of 0.75 (i.e., three slots of each of the four-slot buckets are full, with one free slot). Instead, with first-fit, a large number of buckets become full early on due to this load imbalance. As a consequence, for example, when cuckoo hashing is used with a heavily loaded associative structure, cuckoo chains can become long and result in accesses to many different buckets, e.g. cache lines. In cuckoo hashing, a first hash function $H_1$ and a second hash function $H_2$ may operate on a data item, for example a key-value pair, to calculate two corresponding candidate buckets. When a selected candidate bucket is full, one of the items of the full candidate bucket is evicted. The bucket to which the evicted data item is moved is the alternate bucket corresponding to the other hash function result that was not selected when that evicted data item was first inserted. This process, often referred to as cuckoo chains, continues to evict data items until a data item is evicted to a bucket with available space. Performance of a cuckoo hash table precipitously drops as the table approaches capacity because each insertion requires more work and longer cuckoo chains.

An implementation of K-choice, e.g. two-choice, is used to build concurrent hash tables for key-value stores, perform low-latency large-scale data center scheduling with load balancing, among other applications. However, two-choice, and more generally K-choice, exhibits the drawback of always accessing two buckets regardless of whether accessing a single bucket would have sufficed. These accesses incur a cost that is often detrimental to overall performance. In the case of K-choice in a distributed system, the additional accesses increase the number of messages by up to a factor of K. In a hash table, hash set, cache, etc. K-choice can cause up to K times as many cache/memory accesses.

Two-choice, and more generally K-choice, helps to address problems of load imbalance that lead to reduced performance at high loads when using first-fit. Although two-choice examines two buckets, e.g. two cache lines, because it places the item in the bucket with least load during insertions, the load across buckets is more uniform. Thus, when the associative structure becomes increasingly fuller, there is greater likelihood that at least one of the buckets during an insertion has free capacity. When one bucket has free capacity, then only two cache lines need to be examined. With respect to cuckoo hash tables, the lengths of cuckoo chains are reduced because fewer attempts are needed on average to find a bucket with spare capacity. Where buckets correspond to cache lines, the number of unique cache lines accessed is reduced.

It is expensive accessing two buckets, more generally K buckets, each time. Thus, two-choice is not preferable when first-fit would work trivially by placing the item in the first bucket. However, as the associative structure is filled, first-fit is not always able to place the item in the first bucket, and over time two-choice becomes preferable for a growing number of insertions. Thus, initially it may be advantageous to insert most items with first-fit. As the associative structure fills, it may become more advantageous to insert a growing number of data items with two-choice in order to reduce the number of unique bucket accesses, e.g. cache lines. In one example, incurring the cost of inserting with two-choice to make subsequent insertions easier may be advantageous when an insertion using first-fit would exacerbate load imbalances.

A hybrid mechanism that combines first-fit and K-choice leverages advantages of both approaches by choosing whether to insert, retrieve, delete or modify a data item using either first-fit or K-choice. Such a hybrid mechanism is applicable to applications in both hardware and software. Using a hybrid scheme of first-fit and K-choice, in one example, most data items may be inserted using first-fit hashing. A minority of data items may be inserted using K-choice hashing to smooth out load imbalances that a purely first-fit hashing approach would introduce. Such a hybrid approach of first-fit hashing and K-choice hashing can benefit a wide variety of domains including scheduling, hardware/software caching, distributed systems, address translation, genome sequencing, databases, key-value stores, and networking.

In an example wherein dedicated SRAM-based structures with banking are used, a hybrid mechanism can reduce the number of bank activations. When fewer banks are activated via intelligent implementation of a hybrid mechanism in accordance with the examples provided herein, energy is conserved. Likewise, energy usage scales with data movement. Thus, for a software-based example, by reducing data movement, energy is saved.

Although the description above and below references a hybrid of first-fit and K-choice hashing, other variants are possible. For example, in lieu of or in addition to first-fit hashing, second-fit, third-fit, or the like may be used wherein, instead of the first location being used as in first-fit, the second location, third location, etc. may be used for second-fit, third-fit, etc. Furthermore, in addition to K-choice hashing wherein a data item may be placed in a bucket with a lowest relative load of K possible buckets, the data item may alternatively be placed in any other bucket of the K-buckets. In one example, approximate K-choice may be used wherein a data item is placed in any one of a selection of the least loaded buckets. In this example, a selection of least loaded buckets may be any bucket with a load below some threshold. In another example, a data item may be placed in the second-least loaded bucket, the third least-loaded bucket, the second most-loaded bucket, the most-loaded bucket, etc. Additionally, instead of a hybrid scheme choosing between (a) first-fit or a variant of first-fit and (b) K-choice or a variant of K-choice, a hybrid scheme may choose, for example, between (a) first-fit and (b) a variant of first-fit such as second-fit. Additionally a hybrid scheme may choose, for example, between (a) two-choice and (b) three-choice. Furthermore, the bucket chosen in one variant may be the bucket with the least relative load or the bucket may have a different relative load. In another example, choice between different algorithms for insertion, deletion, retrieval, or modification can vary with time and can occur in orchestrated or random epochs. Hybrid schemes are also possible that combine any combination of these examples including any number of choices of different hash functions.

Additionally, although hybrid schemes are described herein utilizing hash functions, where an output of a hash function is always the same for a given input, hashing relations may also be used wherein different outputs are possible for a given input. For example, a relation may produce a random, pseudorandom, or structured-pseudorandom output that exhibits one or more particular statistical properties for a given input.

Disclosed herein are methods, computing systems, and non-transitory computer readable media enabling hybrid processing of data items in connection with one or more associative structures. In one example, a method for storing a data item on a data storage device includes assessing one or more characteristics of one or more associative structures stored on the data storage device. Based on the assessment, a first algorithm is selected that examines a single location of the one or more associative structures and stores the data item in the single examined location or a second algorithm is selected that examines two or more locations of the one or more associative structures and stores the data item in at least one of the two or more examined locations based on load information of the two or more examined locations. The method further includes storing the data item on the data storage device using the selected algorithm.

In one example, the one or more characteristics includes a load of at least one of the one or more associative structures.

In another example, the first algorithm is a first-fit hash function and the second algorithm is a K-choice hash function.

In another example, a plurality of data items includes the data item and the method further includes applying a partition function on the plurality of data items to generate respective output values. The method further includes grouping data items that generated the same output value into respective groups, and storing the plurality of data items on the data storage device, wherein the storing includes hashing all data items of a respective group in a batch using either the first-fit hash function or the K-choice hash function.

In another example, the method further includes determining a histogram of free capacity across a plurality of buckets in the one or more associative structures stored on the data storage device, computing a hash function on the data item to determine a candidate storage bucket of the plurality of buckets, and comparing a free capacity value of the candidate bucket to the histogram.

In another example, the method further includes performing a look-up, a modification, or a deletion of the data item based on the selected algorithm.

In another example, a method of inserting a data item into a data storage device includes computing a function on the data item to transform the data item into an output value. The output value is compared to a threshold, a hash function is selected from a plurality of hash functions based on the comparing, and the data item is inserted into one or more associative structures stored on the data storage device using the selected hash function.

In another example, the method further includes performing offline profiling on the one or more associative structures and using the offline profiling to set the threshold.

In another example, the method further includes determining a histogram of free capacity across a plurality of buckets in the one or more associative structures.

In another example, the method further includes performing a look-up, a modification, or a deletion of the data item based on the selected hashing.

In another example, the at least two different hash functions include a first-fit hash function and a K-choice hash function, and wherein the first-fit hash function is selected and only a first location is examined to perform the look-up, modification, or deletion.

In another example, the at least two different hash functions include a first-fit hash function and a K-choice hash function, wherein the K-choice hash function is selected and up to K locations are examined as a batch.

In another example, the plurality of hash functions include a first-fit hash function, a two-choice hash function, and three-choice hash function.

In another example, the method further includes selecting between the two-choice hash function and the three-choice hash function based on a comparison with a second threshold.

In another example, a method of inserting a data item into an associative structure stored on a data storage device includes selecting a hash function of a plurality of hash functions to use on the data item based on a characteristic of the associative structure. The data item is inserted into the associative structure using the selected hash function.

In another example, the characteristic includes load information of the associative structure.

In another example, the load information is compared to performance data to select the hash function that is relatively most likely to be the most efficient of the plurality of hash functions.

In another example, the plurality of hash functions includes a first-fit hash function and a K-choice hash function.

In another example, the data storage device is static random access memory (SRAM), wherein the associative structure includes a networking routing table, and wherein the data item is inserted into the networking routing table stored on the SRAM.

In another example, the networking routing table is populated at least in part by cuckoo hashing.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provide graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
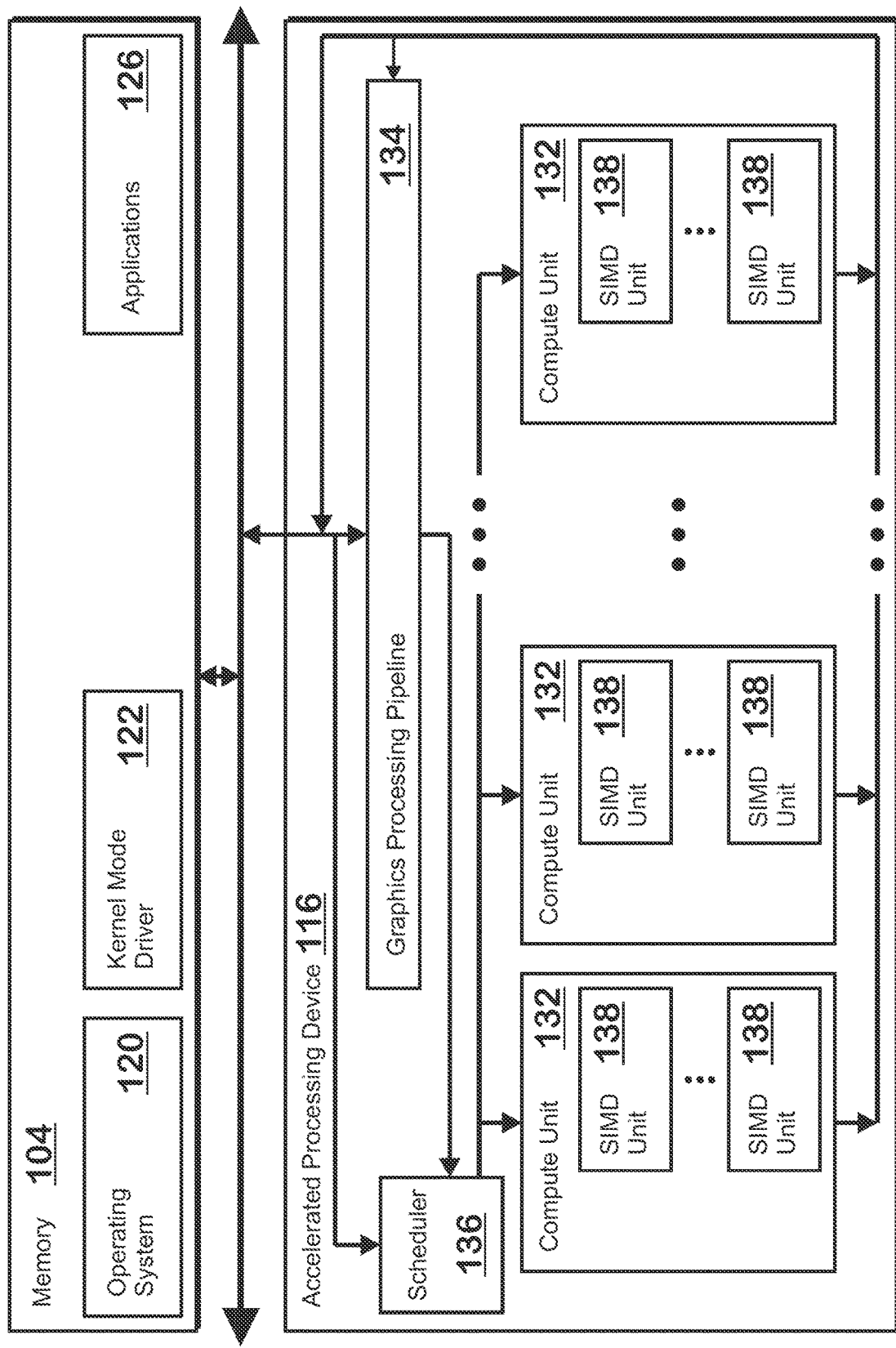
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 also perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Determination of which hash function to use on a data item, I, such as first-fit hashing or K-choice hashing, to insert, retrieve, delete, or modify the data item in an associative structure can be made based various inputs. For example, a selection of a hash function may be based on the value of the data item, a function of the data item, a hashing selection used previously on the data item to, for example, insert the data item, or the determination may be made through evaluation of other criteria.

Figure 3:
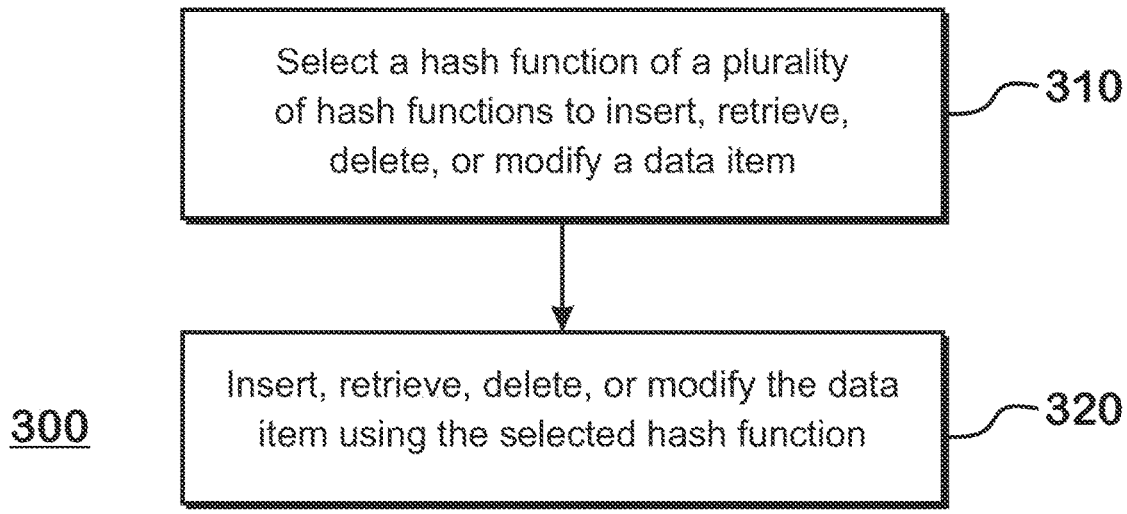
FIG. 3 is a flow diagram depicting an example method for processing a data item in connection with an associative structure.

FIG. 3 is a flow diagram depicting an example method 300 for processing a data item in connection with an associative structure. At step 310, a hash function of a plurality of hash functions is selected to insert, retrieve, delete, or modify a data item. Selection of the hash function, or alternatively selection of a relation as described above applicable to any example provided herein, is based on any one or more of various factors as further described herein to improve the efficiency and lower the cost of the action on the data item in connection with the associative structure. For example, through some determination, two-choice hashing may be selected as the hash function to insert the data item into a cache. For example, a determination may be made that the loading of the associative structure has exceeded a threshold and as such two-choice hashing is selected over first-fit hashing to insert the data item. At step 320, the data item is inserted, retrieved, deleted, or modified using the selected hash function. Continuing with the cache example above, here a two-choice hash function operates on the data item to output two candidate buckets of the cache. In one example, a bucket is sized to a single cache line. The data item is then inserted into the candidate bucket, e.g. cache line, with the lower relative load of the two candidate buckets. In another scenario, first-fit is selected as the more optimal insertion algorithm. This may be, for example, because a hash table or other associative data structure is lightly loaded. In this case, by using first-fit insertion, only a single bucket needs to be accessed. One of ordinary skill in the art would recognize that the variants and alternatives described herein with respect to other examples are similarly applicable to the example depicted in FIG. 3.

Figure 4:
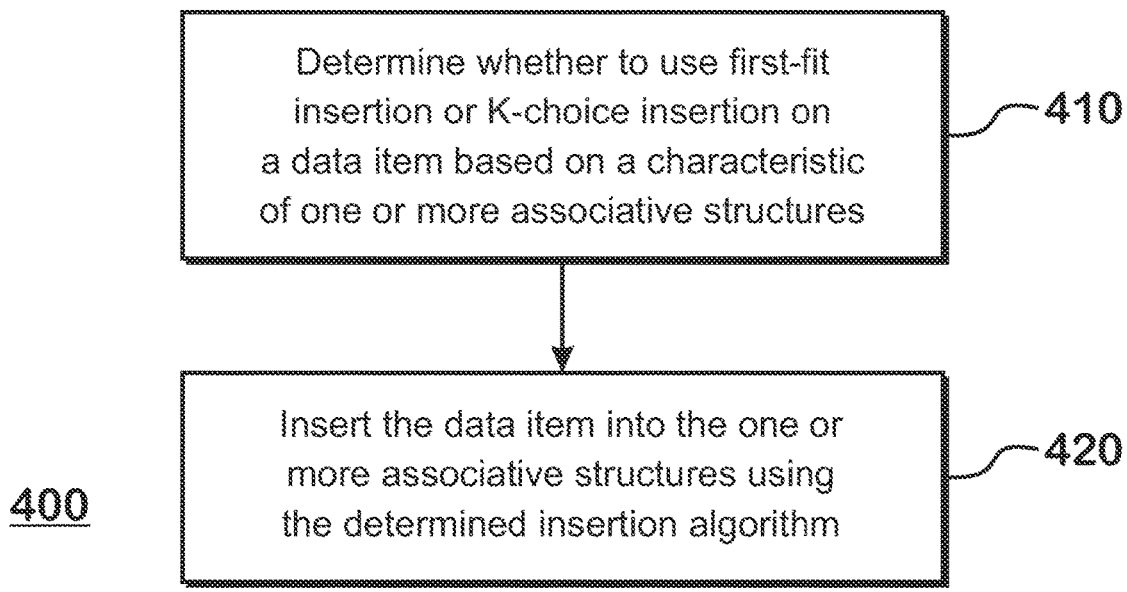
FIG. 4 is a flow diagram depicting another example method for processing a data item in connection with an associative structure.

FIG. 4 is flow diagram depicting another example method 400 for processing a data item in connection with an associative structure. At step 410, a determination is made whether to use, for example, first-fit hashing or K-choice hashing on a data item based on a characteristic of one or more associative structures. For example, offline profiling was performed on performance of a networking routing table. The network routing table may store, for example, entries that map Internet protocol (IP) addresses to media access control (MAC) addresses and ports. In this example, offline profiling determines that in aggregate, first-fit hashing is more efficient when an average load on the buckets is under 90% usage. In other words, when over 10% of the network routing table has available space for storing a data item, offline profiling has determined that in general it is more optimal to insert a data item using first-fit over K-choice. An example of a reason for this may be that when loading is under 90%, an average cost associated with examining K locations associated with K-choice hashing exceeds that of first-fit insertion because first-fit insertion may examine only one location often enough. Beyond 90% loading, offline profiling may have determined that first-fit insertion requires too many serial accesses to candidate buckets until a free bucket is located or the insertion fails such that K-choice insertion has a lower associated cost. Improving load balance across the buckets of the associative data structure by implementing K-choice insertion improves mean and worst-case insertion times at high loads. In an example wherein cuckoo hashing is implemented, K-choice reduces the length of cuckoo chains thereby improving insertion times. In a latency-limited scenario, the loading threshold may be relatively lower due to the latency cost associated with multiple, serial accesses. In a bandwidth-limited scenario, the loading threshold may be relatively higher due to the bandwidth cost of accessing K candidate buckets instead of one bucket. Following these examples, at step 410, a determination may be made that the average load on the routing table is under 90%, and thus a first-fit algorithm is selected to insert the data item.

At step 420, the data item is inserted into the one or more associative structures using the determined algorithm. Continuing with the example above, first-fit hashing was selected. First-fit hashing operates on the data item to determine a first candidate bucket for the data item in the networking routing table. If the first candidate bucket has available space for the data item, the data item is inserted. If the first candidate bucket does not have space, the data item may be first-fit hashed again to determine a new candidate. Hashing may continue until a candidate bucket is found with available space or the data item may not be inserted and the hashing may be considered to have failed. A number of attempts to insert a data item may be a design choice based on the particular implementation and/or current conditions of the implementation.

Although FIG. 4 is a flow diagram depicting an example wherein a choice is made between first-fit insertion or K-choice insertion, as described above, any appropriate function or relation may be selected of a plurality of functions or relations. One of ordinary skill in the art would recognize that the variants and alternatives described herein with respect to other examples are similarly applicable to the example depicted in FIG. 4.

Figure 5:
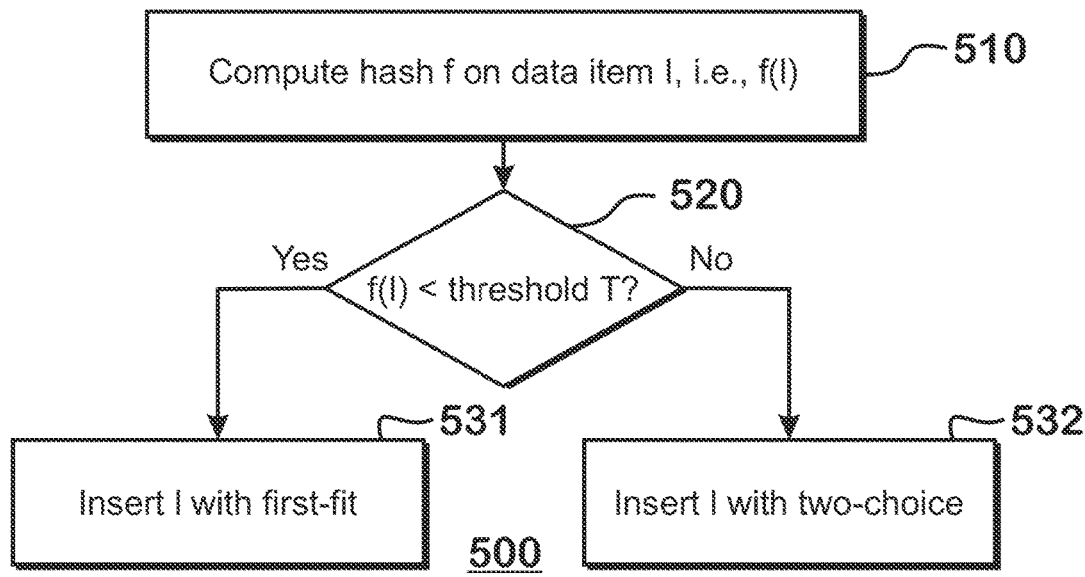
FIG. 5 is a flow diagram depicting another example method for inserting a data item in an associative structure.

FIG. 5 is flow diagram depicting another example method 500 for inserting a data item in an associative structure. At step 510, a hash function $f$ is computed on data item I, i.e. $f(I)$ to produce an output. In one example, the output is a candidate bucket index in the associative structure. In another example, the output is a fingerprint. A fingerprint of a data item I may be a compressed version of the data item I. For example, for a 64-bit data item I, an 8-bit fingerprint may be used instead. A fingerprint may be used in lieu of the data item I in any of the examples provided herein. Additionally or alternatively, multiple fingerprints may be used in lieu of a data item I. In approximate set membership data structures (ASMDSs), a fingerprint is stored to encode the presence of data item I in the set rather than storing an explicit representation of I. Examples of ASMDSs include cuckoo filters, Morton filters, quotient filters, d-left counting Bloom filters, and TinySet filters. When using fingerprints and ASMDSs, lookups of the fingerprint provide a result that indicates the item is probably in the set rather than a definitive answer since the fingerprint is an approximation of the data item I.

At step 520, output $f(I)$ is compared to a threshold T. The threshold T may be a fixed value or may be a dynamically adjusted value. The threshold T can be based on a particular implementation of the associative structure or performance data related to the associative structure. For example, for a bandwidth limited implementation, the threshold may be relatively higher than a similar implementation that is latency limited. If, for example, the output is less than the threshold T, then at step 531 the data item I is inserted into the associative structure with a first-fit algorithm. Alternatively, if, for example, the output is greater than the threshold T, then at step 532 the data item I is inserted into the associative structure with a two-choice algorithm.

Again, as described above, although FIG. 5 depicts a choice between first-fit and two-choice, any combination of algorithms or relations may be used. Additionally, other binary comparisons such as less than or equal to ($<=$), not equal to ($!=$), equal to ($==$), greater than ($>$), and greater than or equal to ($>=$) may be used for comparing the output $f(I)$ with T and selecting which insertion algorithm to use. Further, although FIG. 5 depicts a single threshold T, multiple thresholds are possible. Each range delineated by the thresholds could be distinct or could overlap and each range is associated with a corresponding behavior. Furthermore, although FIG. 5 depicts a method for inserting data item I, additionally or alternatively the data item I can be deleted, retrieved, or modified. One of ordinary skill in the art would recognize that the variants and alternatives described herein with respect to other examples are similarly applicable to the example depicted in FIG. 5.

Figure 6:
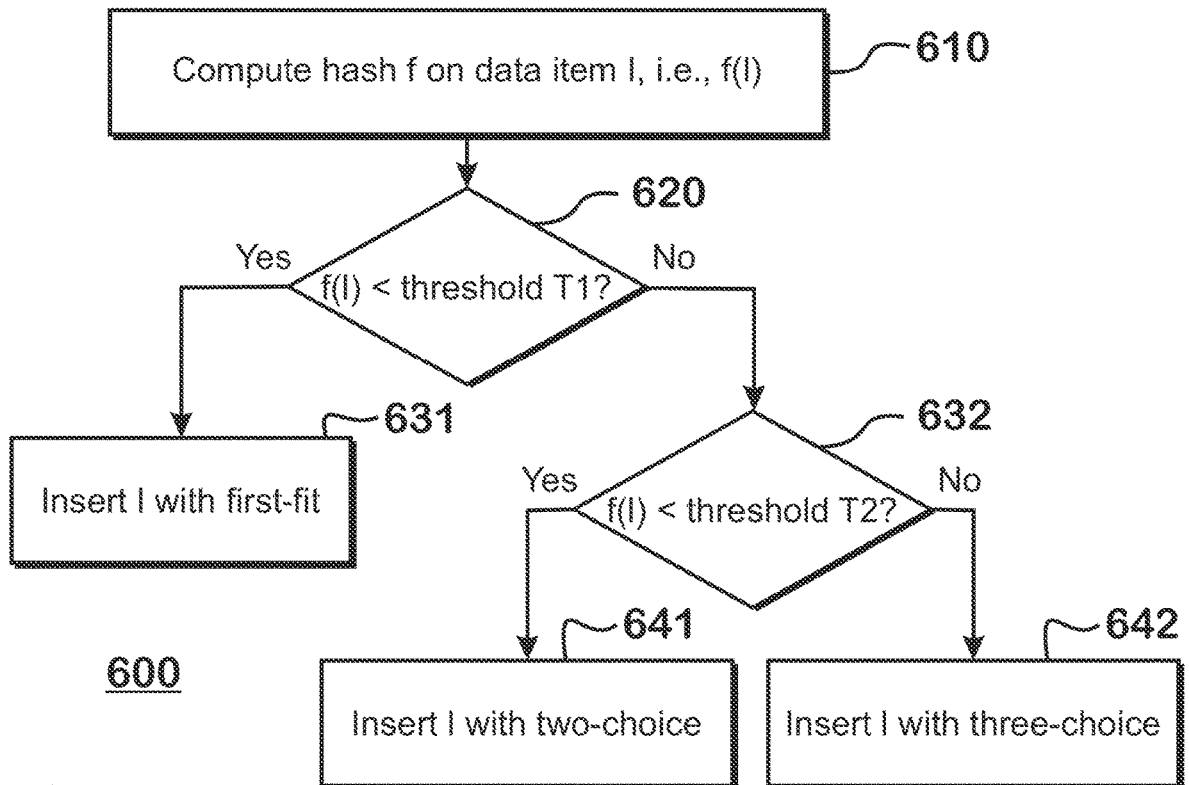
FIG. 6 is a flow diagram depicting an example method for inserting a data item in an associative structure wherein two thresholds are used.

FIG. 6 is a flow diagram depicting an example method 600 for inserting a data item in an associative structure wherein two thresholds, T1 and T2, are used. At step 610, a hash function $f$ is computed on data item I, i.e. $f(I)$ to produce an output, for example, a candidate bucket index in an associative structure. At step 620, $f(I)$ is compared to a threshold T1. If, for example, the output is less than the threshold T1, then at step 631 the data item I is inserted into the associative structure using a first-fit algorithm. If the output is greater than threshold T1, then at step 632 the output is compared to threshold T2. If, for example, the output is greater than T1 but less than T2, then at step 641 the data item I is inserted into the associative structure using a two-choice algorithm. If data item I is both greater than T1 and T2, then at step 642, the data item I is inserted into the associative structure using a three-choice algorithm. One of ordinary skill in the art would recognize that the variants and alternatives described herein with respect to other examples are similarly applicable to the example depicted in FIG. 6.

Figure 7:
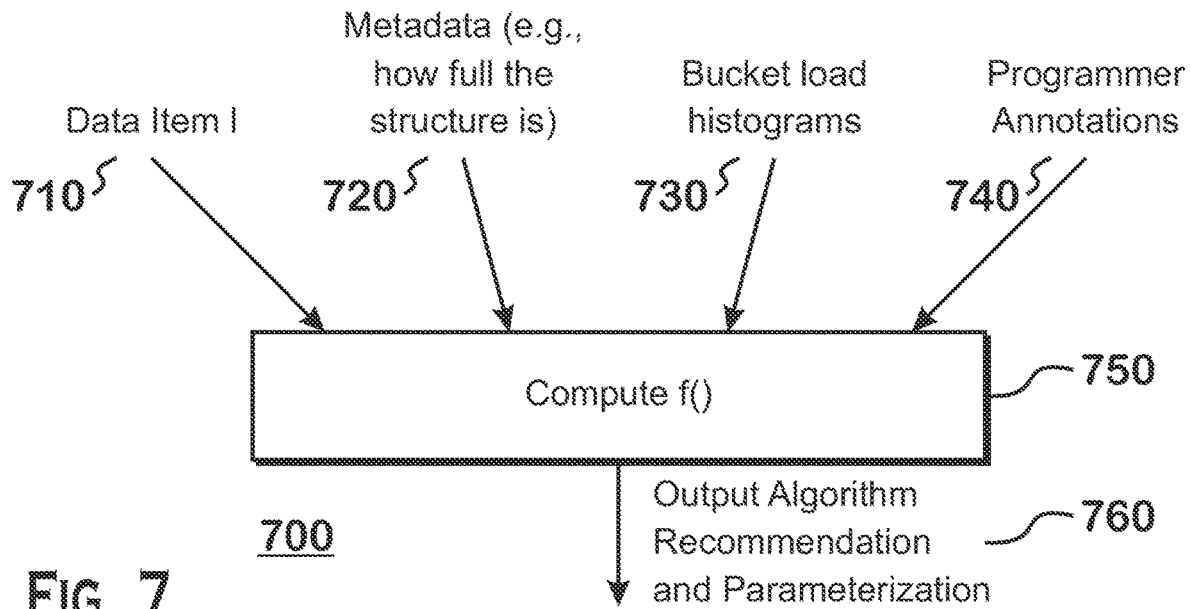
FIG. 7 is a flow diagram depicting another example method for processing a data item in connection with an associative structure.

FIG. 7 is flow diagram depicting another example method 700 for processing a data item in connection with an associative structure. At block 750 $f(\ )$ is computed. Possible inputs to function $f(\ )$ may include a data item I 710, metadata 720 such as how full the associative structure is, a histogram of bucket loads of the associative structure 730, and programmer annotations 740. One of ordinary skill in the art will recognize that other inputs are possible and that any subset of the inputs depicted in FIG. 7 are possible. Additionally or alternatively, none of the inputs depicted may be input into $f(\ )$ such that, for example, a random or pseudorandom output is calculated. Additionally or alternatively $f(\ )$ may exhibit uniformly or non-uniformly distributed randomness and may use any subset of the inputs including no inputs. Metadata 720 includes inter alia load statistics across the buckets of the associative structure such as mean load per bucket, quantiles, loading skew, deviation from a quantile or skew, and kurtosis. At 760, an algorithm for processing data item I along with parameterization is output. For example, based on the various inputs, the output of function $f(\ )$ is used to select a K-choice algorithm, wherein two additional parameters of (a) 4 is selected for processing the data item when it is being (b) inserted, such that four-choice insertion is recommended. Additionally or alternatively, multiple algorithms and parameters may be recommended. One of ordinary skill in the art would recognize that the variants and alternatives described herein with respect to other examples are similarly applicable to the example depicted in FIG. 7.

Figure 8:
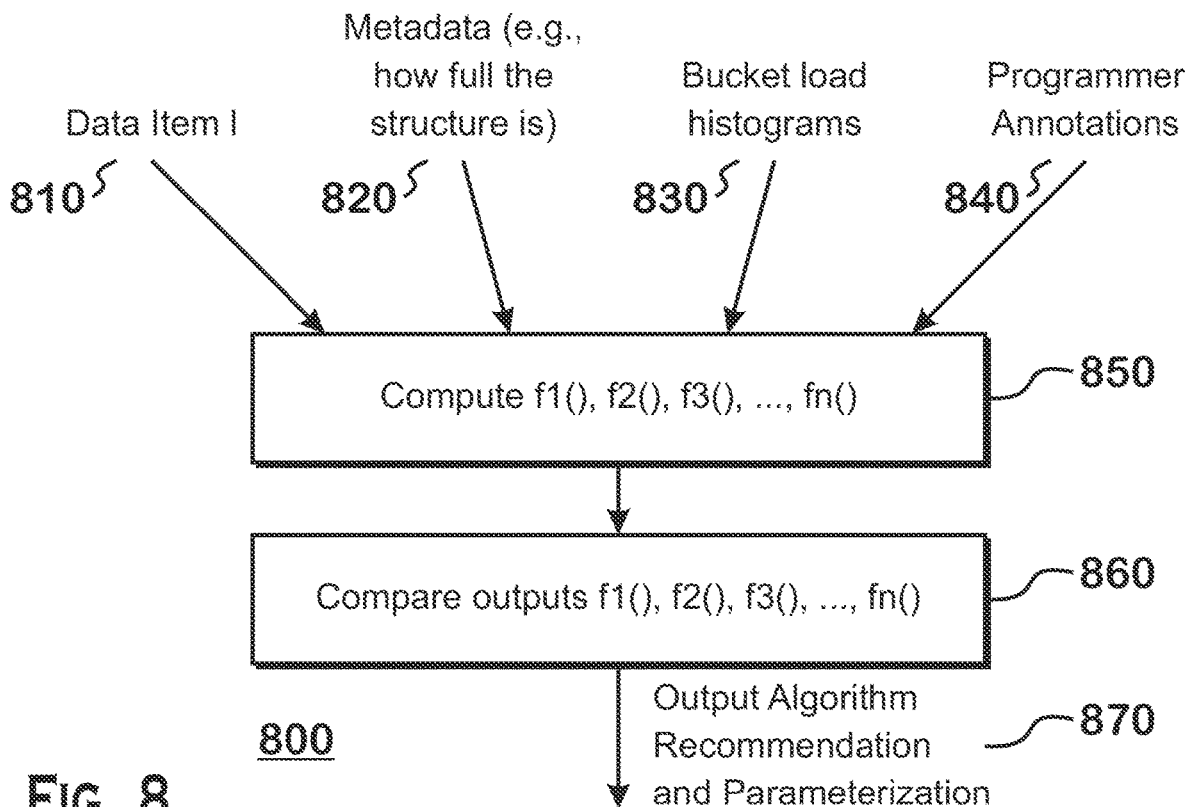
FIG. 8 is a flow diagram depicting another example method for processing a data item in connection with an associative structure.

FIG. 8 is a flow diagram depicting another example method 800 for processing a data item in connection with an associative structure. At block 850 a plurality of functions $f1(\ ), f2(\ ), f3(\ ), \ldots fn(\ )$ are computed. The number of functions depicted is not meant to be limiting. Any number of functions is possible. Possible inputs to the functions may include a data item I 810, metadata 820 such as how full the associative structure is, a histogram of bucket loads of the associative structure 830, and programmer annotations 840. One of ordinary skill in the art will recognize that other inputs are possible and that any subset of the inputs depicted in FIG. 8 are possible. Additionally or alternatively, none of the inputs depicted may be input into any of the functions such that, for example, random or pseudorandom outputs may be calculated. At block 860 the outputs from the functions computed in block 850 are compared to select a recommendation for an algorithm and one or more parameters for operating on the data item I. At 870 an algorithm for processing data item I along with parameterization is output. For example, based on the various inputs, a K-choice algorithm is selected, wherein two additional parameters of (a) 2 is selected for processing the data item when it is being (b) retrieved, such that two-choice retrieval is recommended. Additional recommendations may also be output for insertion, deletion, and/or modification of the data item I. One of ordinary skill in the art would recognize that the variants and alternatives described herein with respect to other examples are similarly applicable to the example depicted in FIG. 8.

Figure 9:
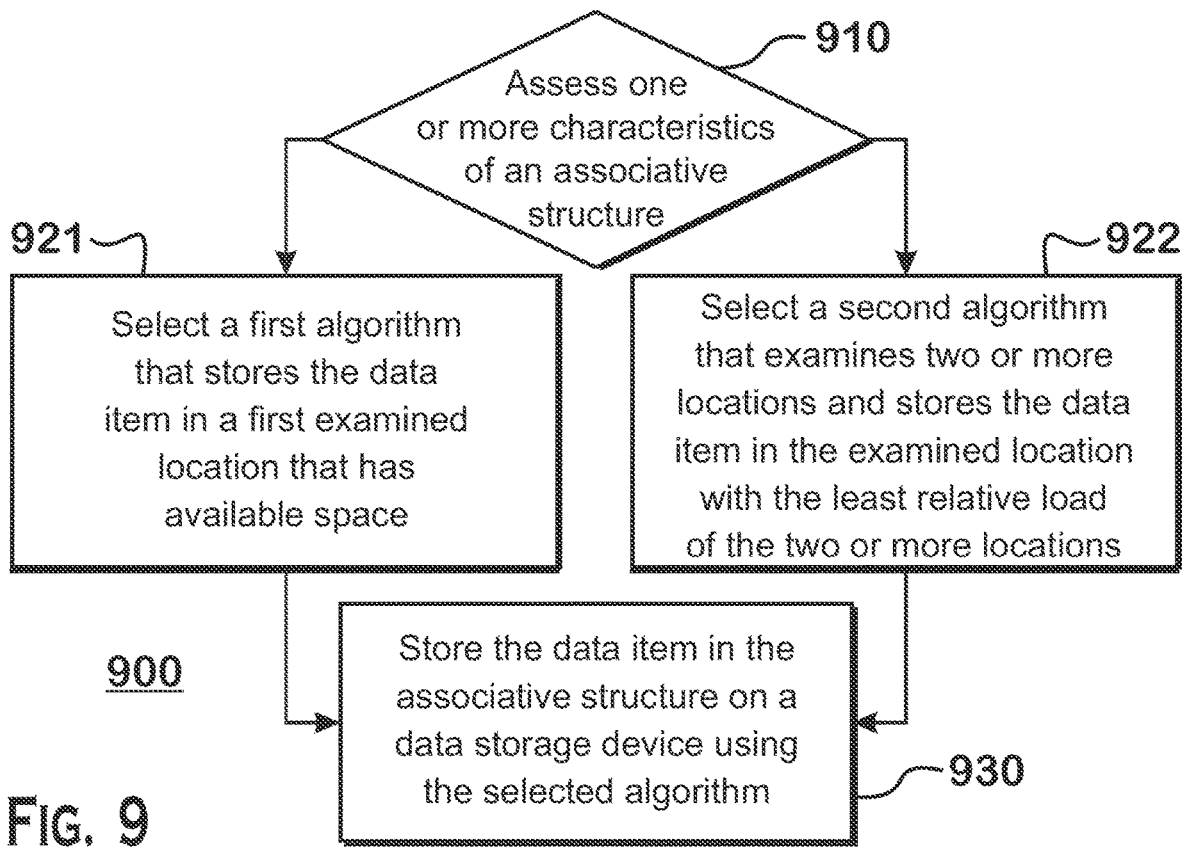
FIG. 9 is a flow diagram depicting another example method for processing a data item in connection with an associative structure.

FIG. 9 is a flow diagram depicting another example method 900 for processing a data item in connection with an associative structure. At step 910, one or more characteristics of the associative structure are assessed. For example, characteristics include but are not limited to load statistics across the buckets of the associative structure such as mean load per bucket, quantiles, loading skew, deviation from a quantile or skew, and kurtosis. Based on the assessment at step 910, an algorithm for storing the data item is selected. In one scenario, at step 921, a first algorithm is selected that stores the data item in a first examined location that has available space. An example of such an algorithm is a first-fit algorithm. It should be recognized, as described above, alternative algorithms such as second-fit, third-fit, etc. are possible. In a second scenario, at step 922, a second algorithm is selected that examines two or more locations and stores the data item in the examined location with the least relative load of the two or more locations. An example of such an algorithm is a two-choice algorithm. It should be recognized, as described above, alternative algorithms such as approximate two-choice, three-choice, etc. are possible. At step 930, the data item is stored in the associative structure on a data storage device using the selected algorithm. Additionally or alternatively, the data item can be deleted, modified, or retrieved using the selected algorithm, as described above. One of ordinary skill in the art would recognize that the variants and alternatives described herein with respect to other examples are similarly applicable to the example depicted in FIG. 9.

Figure 10:
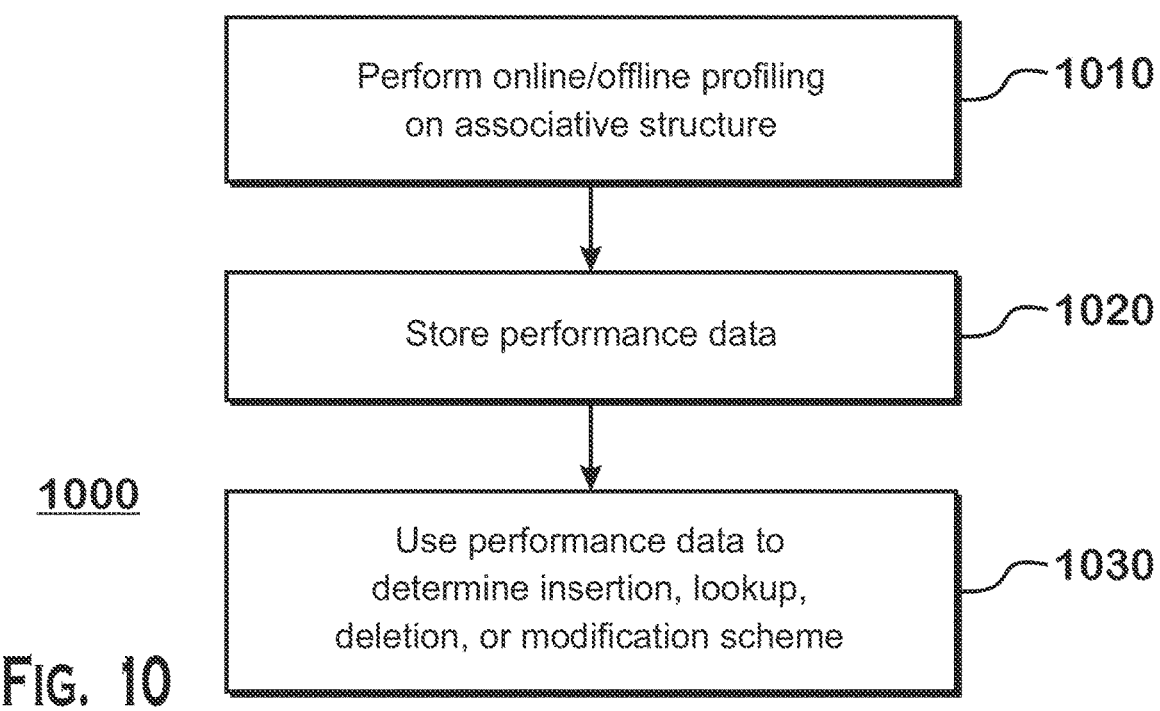
FIG. 10 is a flow diagram depicting another example method for use in connection with an associative structure.

FIG. 10 is a flow diagram depicting another example method 1000 for use in connection with an associative structure. As described above, metadata and load statistics of the associative structure can be used to influence selection of an algorithm for operating on the data item to, for example, insert the data item into the associative structure. At step 1010, online or offline profiling of the associative structure may be performed. Profiling may, for example, assess the load statistics or measure performance of operation in connection with the associative structure. For example, the relative cost of inserting items using first-fit vs. two-choice can be tracked across various loads. This cost relates to an overall performance of the associative structure for maintaining the data items therein. At step 1020, performance data is stored corresponding to the measured performance. At step 1030, performance data is used to determine an insertion, lookup, deletion, or modification scheme. For example, the performance data may be used to calculate thresholds for deciding which insertion algorithm to use for future data items. One of ordinary skill in the art would recognize that the variants and alternatives described herein with respect to other examples are similarly applicable to the example depicted in FIG. 10.

Figure 11:
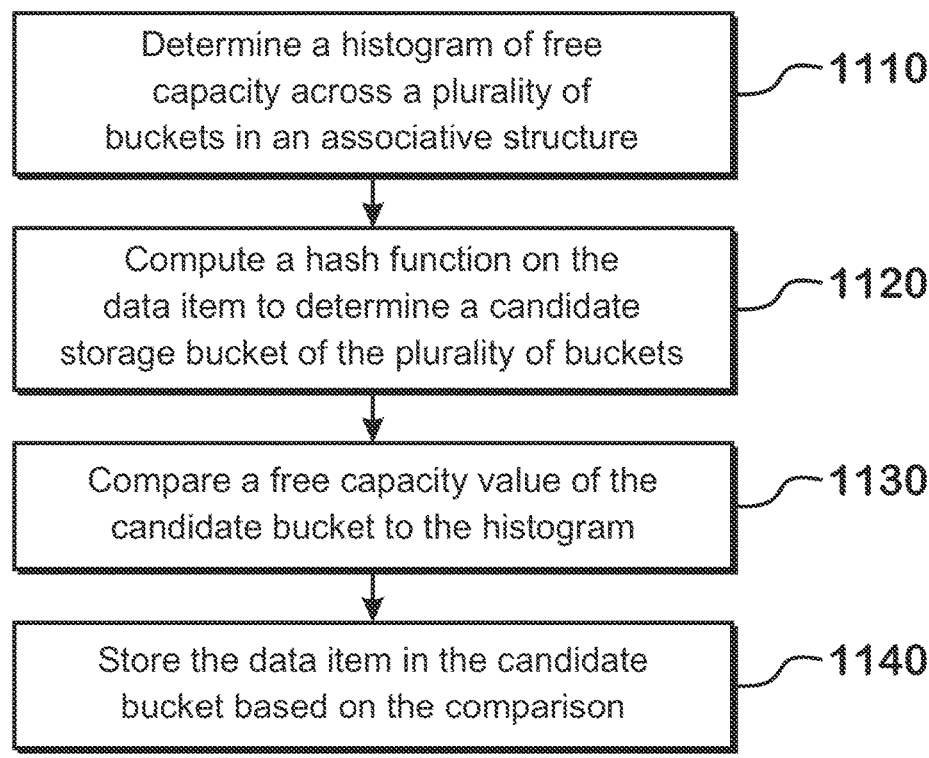
FIG. 11 is a flow diagram depicting another example method for use in connection with an associative structure.

FIG. 11 is a flow diagram depicting another example method 1100 for use in connection with an associative structure. At step 1110, a histogram of free capacity across a plurality of buckets in the associative structure is determined. At step 1120, a hash function is computed on the data item to determine a candidate bucket of the plurality of buckets for storing the data item. At step 1130, a free capacity value of the candidate bucket is compared to the histogram. At step 1140, the data item is stored in the candidate bucket based on the comparison. As an example, a candidate bucket with 40% space available for storing is calculated. Comparing the available space to the histogram, it is determined that this bucket is a relatively lowly loaded bucket compared to the other buckets in the associative structure. The data item is then stored in this bucket. However, if it is determined that this bucket is relatively highly loaded compared to the other buckets, another bucket may be examined or a K-choice algorithm may be implemented to avoid creating further load imbalances. One of ordinary skill in the art would recognize that the variants and alternatives described herein with respect to other examples are similarly applicable to the example depicted in FIG. 11.

In another example, a first bucket is accessed and its load is assessed. By comparing its load to a histogram of the bucket loads, it can be determined into which percentile the first bucket's load falls. In one example, the histogram of bucket loads is an approximate representation of the cumulative distribution function of bucket loads. If the first bucket's load is above a quantile, e.g., the median, two-choice is selected to avoid contributing to excessive load imbalance when the table is fuller. For instance, if the first bucket's load is in the lowest decile, it is likely that a second bucket is more heavily loaded than the first bucket. Thus, placing the item in the first bucket is unlikely to contribute to further load imbalance. The inherent trade-off is performing more work, e.g., more unique cache accesses, when the associative structure is more lightly loaded to mitigate considerably more work, e.g., unique cache accesses, when the associative structure is fuller.

A way to improve the throughput or performance of an operation is batching or pipelining since more parallelism can be extracted. A challenge of the hybrid scheme disclosed herein is that it effectively branches functionality depending on various factors, such as the item, a function of the item, or characteristics of the associative structure. In software, example code may have the following general loop structure:

For item I in batch:

```
If (f(I) < threshold T){
    Perform_First_Fit(I);
}
Else{
    Perform_K_choice(I);
}
}
```

The above code may cause branch mispredictions on a CPU or GPU. On a CPU, the branch associated with the "if" statement may not be easily predictable if batches are a random mix of items. On CPUs and GPUs, the branch may inhibit maximum parallelism because it could lead to SIMD lanes being disabled. Alternatively, the branch could result in complex/convoluted machine code. An example of a solution to the branching issue is to presort or partition a batch based on whether items of the batch should employ first-fit or K-choice operations. That way, the branch will be taken many times and then not taken many times. Again, as disclosed throughout the examples provided herein, first-fit and K-choice are merely two possibilities of algorithms. Other algorithms including more than two algorithms and parameters affecting the operation of the algorithms are also possible.

In one example, the items are randomly split into batches and then those batches are grouped based on whether an item will be operated upon using a first-fit or K-choice algorithm. In another example, a "superbatching" methodology is employed. A large group of items are processed in a flight known as a superbatch. The superbatch is then partitioned into a plurality of batches, with each batch consisting exclusively of items of a specific type (e.g., first-fit or K-choice). Each batch is then processed using the algorithm of choice for its data items. As such, the branching from within a batch, where it can be problematic for performance, is moved to between batches where it is less of a concern and its cost can be amortized.

A consideration of the superbatching approach is whether there is sufficient work at any time to form more than one batch. If this is not the case, then the system may determine dynamically whether to proceed with partially full batches or to wait for full batches based on overall optimization criteria, service-level agreements, or other high-level considerations.

Figure 12:
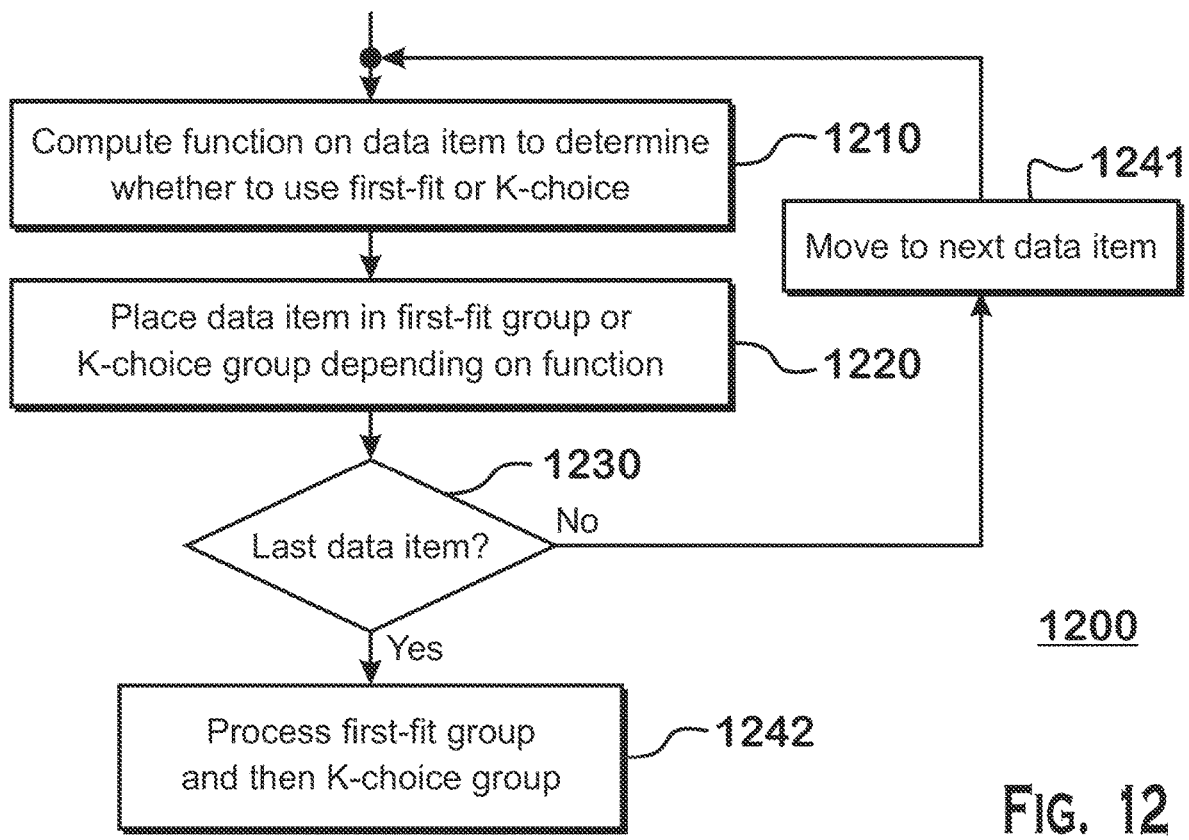
FIG. 12 is a flow diagram depicting an example method for presorting items into groups corresponding to different algorithms.

FIG. 12 is a flow diagram depicting an example method 1200 for presorting items into groups corresponding to different algorithms. At step 1210, a function is computed on a data item to determine whether to use, for example, first-fit or K-choice. At step 1220, the data item is placed in the appropriate group corresponding to the determined algorithm, e.g. first-fit or K-choice. At step 1230, it is determined whether the data item is the last data item in the batch. If not, the method 1200 moves to step 1241 and the next data item is selected. If the data item is the last data item, then the method 1200 moves to step 1242 where, for example, the group of first-fit items are processed and then the group of K-choice items are processed. The order in which the groups are processed can be swapped and there may be multiple groups of each type. Further, all groups of one type need not be processed entirely before another group is processed. Processing of the groups includes inserting the items into the associative structure, deleting the items, modifying the items, retrieving the items, or any combination thereof. One of ordinary skill in the art would recognize that the variants and alternatives described herein with respect to other examples are similarly applicable to the example depicted in FIG. 12.

In another example, the choice of insertion algorithm informs the implementation of other algorithms. For example, for lookups, the choice of insertion algorithm for an item I serves as a determining factor for selecting the type of lookup algorithm to use. In some cases, fetching all candidate buckets in a batch is the preferred algorithm because it avoids the latency penalty of fetching/accessing the buckets in series. In other cases, the preferred algorithm fetches the buckets in series subject to whether the queried data item is found in the first bucket. By fetching candidate buckets in series, bandwidth can be saved if data item I is found in a bucket other than the last candidate bucket.

Figure 13:
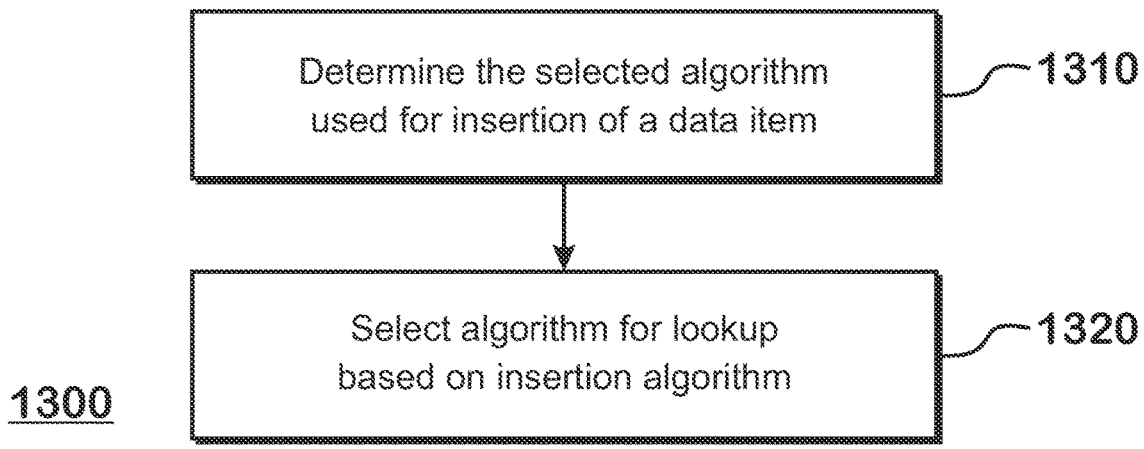
FIG. 13 is a flow diagram depicting an example method wherein a selection of one algorithm informs the selection of another algorithm.

FIG. 13 is a flow diagram depicting an example method 1300 wherein a selection of one algorithm informs the selection of another algorithm. At step 1310, the selected algorithm used for insertion of a data item is determined. At step 1320, an algorithm for the lookup is selected based on the determined insertion algorithm. One of ordinary skill in the art would recognize that the variants and alternatives described herein with respect to other examples are similarly applicable to the example depicted in FIG. 13.

In one example, the choice of insertion algorithm for data item I is used to decide whether to fetch the candidate buckets for a lookup in series or in parallel. Similarly, for modification and deletion operations, the choice of the insertion algorithm used for data item I informs the initial retrieval algorithm and how the associated operation is applied to the data item I. For example, the choice of K-choice for insertions may direct deletions to rebalance all or part of the buckets by remapping one or more of the existing data items to alternate buckets.

Figure 14:
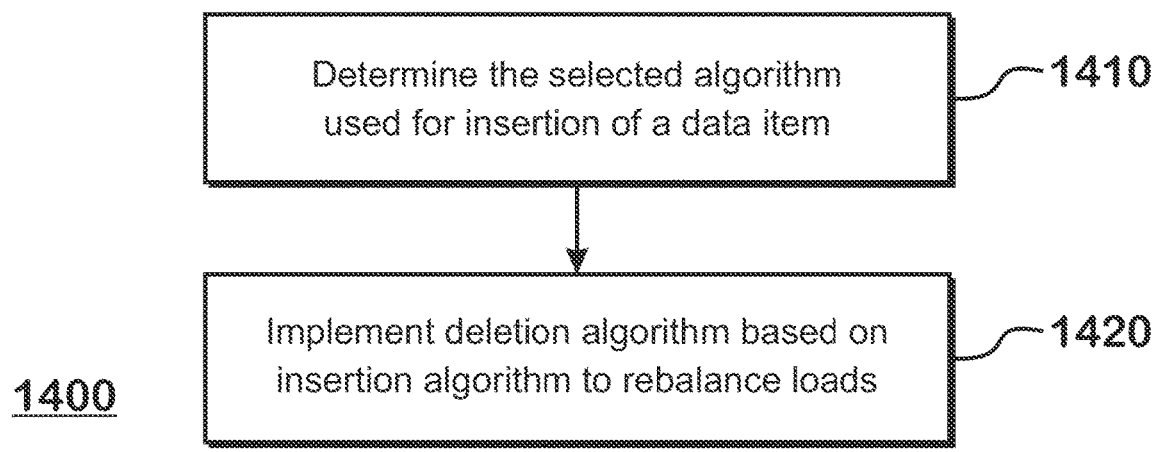
FIG. 14 is a flow diagram depicting an example method wherein a selected insertion algorithm is used to implement a deletion scheme.

FIG. 14 is a flow diagram depicting an example method 1400 wherein a selected insertion algorithm is used to implement a deletion scheme. At step 1410, the algorithm selected for insertion of a data item is determined. At step 1420, based on the selected insertion algorithm, one or more deletion algorithms are implemented to rebalance bucket loads. For example, after several first-fit insertions, it may be beneficial to remap other data items to less full buckets to balance loading across buckets of the associative structure. One of ordinary skill in the art would recognize that the variants and alternatives described herein with respect to other examples are similarly applicable to the example depicted in FIG. 14.

In another example, a group of one or more functions dictate additional per-operation behavior, for example lookup, insertion, deletion, or modification. In one example, first-fit is initially selected when inserting items but this selection transitions to accessing all buckets on subsequent lookups of the item. Such a policy is useful when the load on the associative structure approaches the maximum capacity and there is a large penalty to not fetching all buckets that might be needed. For example, if not fetching all buckets incurs an expensive branch misprediction with sufficiently high probability once a load threshold is passed, then it may be beneficial to fetch all candidate buckets. For example, when the associative structure is a hardware cache, each data item may be placed in multiple candidate sets. As such, the multiple candidate sets are fetched in parallel to lookup data item I.

Figure 15:
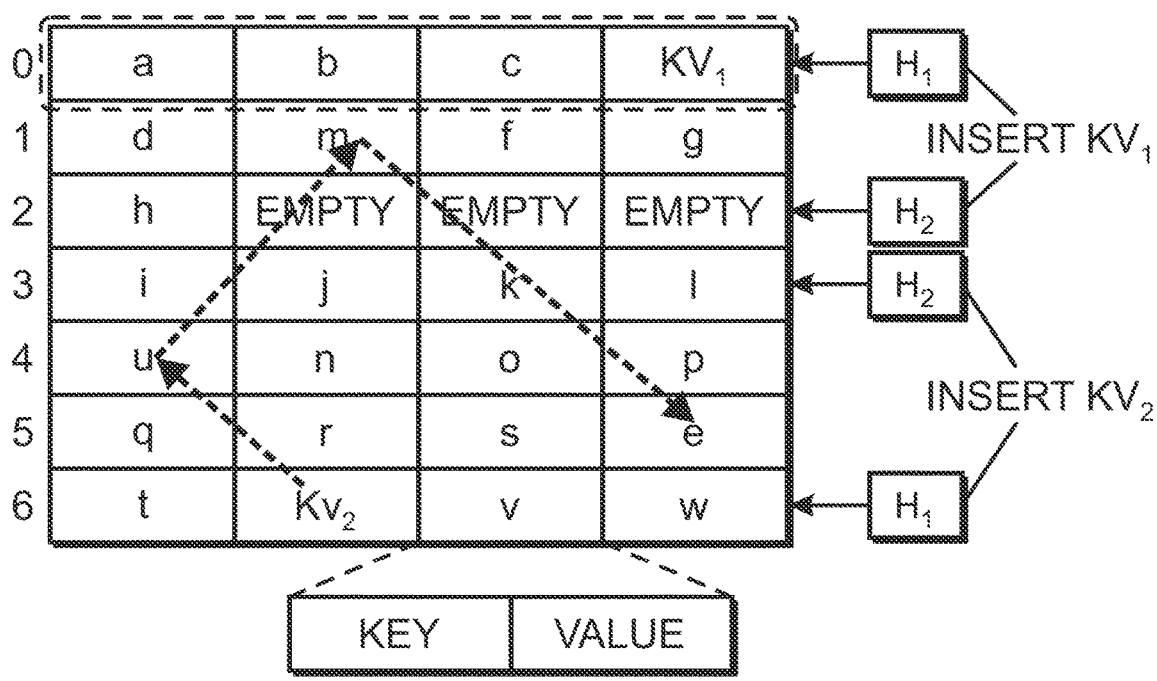
FIG. 15 depicts cuckoo hashing wherein a first-fit algorithm is used to insert data items.
Figure 16:
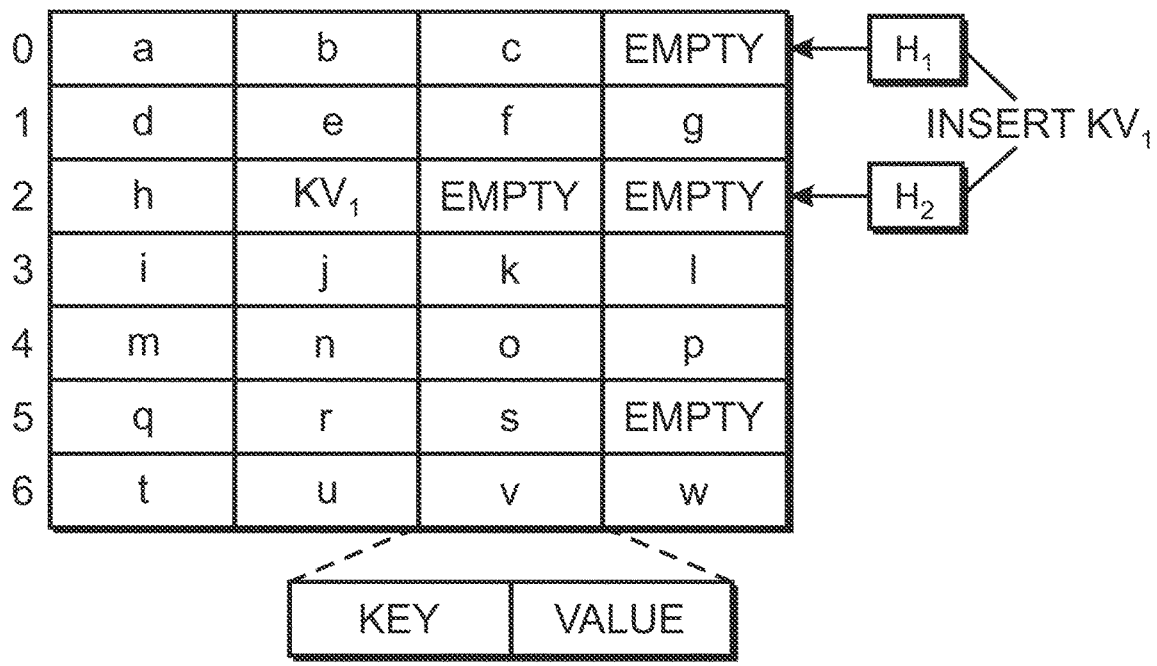
FIG. 16 depicts cuckoo hashing wherein a two-choice algorithm is used to insert a data item.

FIGS. 15 and 16 depict examples of cuckoo hashing. In FIGS. 15 and 16, rows of the depicted table are labeled from 0 to 6. Each row corresponds to a bucket in a cuckoo hash table. Each slot within a row represents a location for a potential data item. The letters labeling various different slots represent data items inserted into the hash table. "EMPTY" represents an available slot within a bucket. The hash tables depicted in FIGS. 15 and 16 represent a same state prior to the insertion of key-value pairs $KV_1$ and $KV_2$.

FIG. 15 depicts cuckoo hashing wherein a first-fit algorithm is used to insert data items, e.g. key-value pairs $KV_1$ and $KV_2$, into the hash table. The letters corresponding to data items are in alphabetical order except for those corresponding data items that were evicted. For key-value pair $KV_1$, a first hash function $H_1$ computes a candidate bucket of 0. A second hash function $H_2$ computes a candidate bucket of 2. In accordance with first-fit insertion, because candidate bucket 0 computed by first hash function $H_1$ on $KV_1$ has available space, $KV_1$ is inserted into candidate bucket 0 even though candidate bucket 2 calculated by $H_2$ on $KV_1$ has less load than candidate bucket 0. For key-value pair $KV_2$, the first hash function $H_1$ computes a candidate bucket of 6. The second hash function $H_2$ computes a candidate bucket of 3. In accordance with first-fit insertion, because neither bucket has available space, $KV_1$ is inserted into the first candidate bucket 6 calculated by $H_1$. As a result, a data item u, already stored in candidate bucket 6 is evicted to its alternate candidate bucket, bucket 4. Bucket 4 also has no available space. As such, data item m is evicted to its alternate candidate bucket, bucket 1. Bucket 1 also has no available space. As such, data item e is evicted to its alternate candidate bucket, bucket 5. Bucket 5 has available space, and as such this cuckoo chain is now finished and the work needed to insert $KV_2$ is complete.

FIG. 16 depicts cuckoo hashing wherein a two-choice algorithm is used to insert a data item, e.g. key-value pair $KV_1$, into the hash table. In this case, candidate buckets 0 and 2, calculated by corresponding first and second hash functions $H_1$ and $H_2$, both have available space to store $KV_1$. In accordance with two-choice, the candidate bucket with the lowest relative load of the two candidate buckets is selected. As such, in this case, $KV_1$ is inserted into candidate bucket 2. This scenario results in a more balanced hash table than if $KV_1$ were inserted into candidate bucket 0 corresponding to the first-fit choice, but at the cost of needing to examine two candidate buckets instead of one.

The examples in FIGS. 15 and 16 should serve to demonstrate the benefits and drawbacks of first-fit and two-choice insertion algorithms for use with a cuckoo hash table. Although FIGS. 15 and 16 depict a particular number of buckets, a particular number of slots within buckets, and a particular state of loads across the buckets, one of ordinary skill should recognize that different numbers of buckets and slots and differently loaded buckets are also possible.

Another example of a well-known hash table implementation is a Morton filter. First-fit is the conventional Morton filter insertion algorithm. A hybrid approach in accordance with the examples provided herein results in a 4× improvement in insertion throughput at a load factor of 0.95 (i.e., where the filter is 95% full).

Using the conventional first-fit insertion algorithm, insertion throughput for the Morton filter is measured at approximately 4 million insertions per second. When using a hybrid first-fit two-choice approach, insertions increase to about 16 to 17 million insertions per second. The insertion throughput of the hybrid approach described herein in the Morton filter is also superior to insertions using two-choice hashing in the Morton filter. Two-choice hashing obtains consistent insertion throughput up to high loads (e.g., 0.95 to 0.98) of 9 to 10 million insertions per second. However, it is considerably slower than first-fit at low loads. First-fit achieves 16 million to 20 million insertions per second up to a load factor of 0.75, which is better than two-choice's 9 or 10 million insertions per second. The hybrid approach sacrifices little throughput at low loads, approaching the 16-20 million insertions per second, and is considerably faster than either approach at high loads. Moreover, the hybrid algorithm permits a Morton filter to be up to approximately 30×-60× faster when co-optimizing other operations like lookups and deletions in accordance with the description provided herein.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, and the hardware and/or software responsible for implementing the hybrid first-fit and K-choice hashing scheme described herein may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of storing a data item on a data storage device, the method comprising:
   profiling a performance associated with the data storage device when using a first algorithm for inserting data items across a plurality of load levels of one or more associative structures stored on the data storage device and using a second algorithm for inserting data items across the plurality of load levels of the one or more associative structures stored on the data storage device to determine a load level threshold below which the first algorithm is more efficient for storing than the second algorithm;
   inserting data items in the one or more associative structures using the first algorithm until a load level of the data storage device reaches the determined load level threshold; and
   inserting data items in the one or more associative structures using the second algorithm once the load level of the data storage device exceeds the determined load level threshold.

2. The method of claim 1, wherein the first algorithm is a first-fit hash function and the second algorithm is a K-choice hash function, wherein the first algorithm includes serially examining, per insertion attempt, a single location of the one or more associative structures until a location is found that has available space to store the data item and stores the data item in the found location, and wherein the second algorithm includes examining, per insertion attempt, at least one group of two or more locations of the one or more associative structures until a location is found that has available space to store the data item and stores the data item in a location within a group of two or more examined locations based on load information of the two or more examined locations.

3. The method of claim 2, further comprising:
   applying a partition function on the data items to generate respective output values;
   grouping subsets of the data items that generated the same output value into respective groups; and
   storing the data items on the data storage device, wherein the storing includes hashing all data items of a respective group in a batch using either the first-fit hash function or the K-choice hash function.

4. The method of claim 1, further comprising:
   determining a histogram of free capacity across a plurality of buckets in the one or more associative structures stored on the data storage device;
   computing one or more hash functions on a data item of the data items to determine one or more candidate buckets of the plurality of buckets; and
   comparing at least one free capacity value associated with each of the one or more candidate buckets to the histogram.

5. The method of claim 1, further comprising performing a look-up, a modification, or a deletion of a data item of the data items using the first algorithm on a condition that the first algorithm was used to insert the data item or using the second algorithm on a condition that the second algorithm was used to insert the data item.

6. The method of claim 1, wherein the profiling the performance of the data storage device includes tracking a bandwidth used when using the first algorithm and when using the second algorithm.

7. The method of claim 1, wherein the profiling the performance of the data storage device includes tracking a latency incurred by inserting the data items using the first algorithm and using the second algorithm.

8. The method of claim 4, wherein the data storage device is a cache, and wherein each bucket of the plurality of buckets corresponds to a cache line.

9. The method of claim 1, wherein:
   the data storage device is static random access memory (SRAM);
   the associative structure includes a networking routing table; and
   the data items are inserted into the networking routing table stored on the SRAM.

10. The method of claim 1, further comprising increasing the load level threshold based on prioritizing bandwidth over latency.

11. A non-transitory computer readable storage medium storing instructions thereon that, when executed, cause an apparatus to:
    profile a performance associated with a data storage device when using a first algorithm for inserting data items across a plurality of load levels of one or more associative structures stored on the data storage device and using a second algorithm for inserting data items across the plurality of load levels of the one or more associative structures stored on the data storage device to determine a load level threshold below which the first algorithm is more efficient for storing than the second algorithm;
    insert data items in the one or more associative structures using the first algorithm until a load level of the data storage device reaches the determined load level threshold; and
    insert data items in the one or more associative structures using the second algorithm once the load level of the data storage device exceeds the determined load level threshold.

12. The non-transitory computer readable storage medium of claim 11, wherein the first algorithm is a first-fit hash function and the second algorithm is a K-choice hash function, wherein the first algorithm includes serially examining, per insertion attempt, a single location of the one or more associative structures until a location is found that has available space to store the data item and stores the data item in the found location, and wherein the second algorithm includes examining, per insertion attempt, at least one group of two or more locations of the one or more associative structures until a location is found that has available space to store the data item and stores the data item in a location within a group of two or more examined locations based on load information of the two or more examined locations.

13. The non-transitory computer readable storage medium of claim 12, wherein the instructions, when executed, further cause the apparatus to:
    apply a partition function on the data items to generate respective output values;
    group subsets of the data items that generated the same output value into respective groups; and
    store the data items on the data storage device, wherein the storing includes hashing all data items of a respective group in a batch using either the first-fit hash function or the K-choice hash function.

14. The non-transitory computer readable storage medium of claim 11, wherein the instructions, when executed, further cause the apparatus to:
    determine a histogram of free capacity across a plurality of buckets in the one or more associative structures stored on the data storage device;

compute one or more hash functions on a data item of the data items to determine one or more candidate buckets of the plurality of buckets; and compare at least one free capacity value associated with each of the one or more candidate buckets to the histogram.

15. The non-transitory computer readable storage medium of claim 14, wherein the data storage device is a cache, and wherein each bucket of the plurality of buckets corresponds to a cache line.

16. The non-transitory computer readable storage medium of claim 11, wherein the instructions, when executed, further cause the apparatus to perform a look-up, a modification, or a deletion of a data item of the data items using the first algorithm on a condition that the first algorithm was used to insert the data item or using the second algorithm on a condition that the second algorithm was used to insert the data item.

17. The non-transitory computer readable storage medium of claim 11, wherein the instructions, when executed, further cause the apparatus to track a bandwidth used when inserting the data items using the first algorithm and when using the second algorithm.

18. The non-transitory computer readable storage medium of claim 11, wherein the instructions, when executed, further cause the apparatus to track a latency incurred by inserting the data items using the first algorithm and using the second algorithm.

19. The non-transitory computer readable storage medium of claim 11, wherein:
the data storage device is static random access memory (SRAM);
the associative structure includes a networking routing table; and
the data items are inserted into the networking routing table stored on the SRAM.

20. The non-transitory computer readable storage medium of claim 11, wherein the instructions, when executed, further cause the apparatus to increase the load level threshold based on prioritizing bandwidth over latency.

* * * * *